Figure 1:
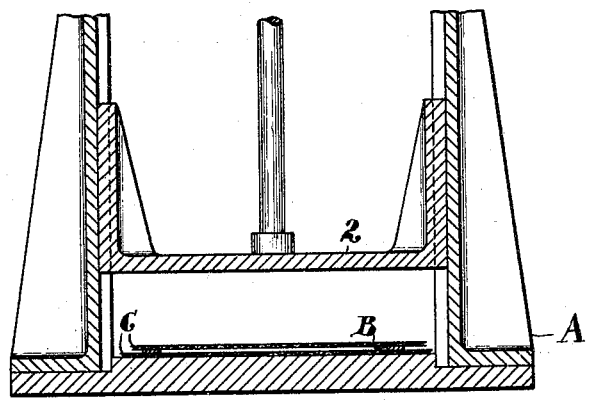

No. 779,146. PATENTED JAN. 3, 1905.
C. H. WORKMAN & J. EISENBACH.
MANUFACTURE OF TORTILLAS.
APPLICATION FILED SEPT. 20, 1904.

Witnesses:-

Inventors
Charles H. Workman
Julius Eisenbach
By Geo H Strong Atty

No. 779,146. Patented January 3, 1905.

UNITED STATES PATENT OFFICE.

CHARLES H. WORKMAN AND JULIUS EISENBACH, OF SAN FRANCISCO, CALIFORNIA.

MANUFACTURE OF TORTILLAS.

SPECIFICATION forming part of Letters Patent No. 779,146, dated January 3, 1905.

Application filed September 20, 1904. Serial No. 225,217.

*To all whom it may concern:*

Be it known that we, CHARLES H. WORKMAN and JULIUS EISENBACH, citizens of the United States, residing at San Francisco, in the county of San Francisco and State of California, have invented new and useful Improvements in the Manufacture of Tortillas, of which the following is a specification.

Our invention relates to improvements in the manufacture of tortillas in commercial quantities.

A tortilla is a sort of pancake prepared by the Mexicans from maize or corn and forming a staple article of food by itself, as well as a wrapper for other food products, such as enchiladas. Heretofore it has been customary to make the tortillas in a tedious and primitive fashion by hand. The corn after being boiled to cleanse and soften it, so that the hull becomes cracked and may be easily pulled off, is ground or crushed and kneaded to form a stiff sticky dough. A bit of this dough is then taken and skilfully patted out by hand into a large thin tenacious pancake about one thirty-second of an inch in thickness and then baked or toasted first on one side and then on the other. When baked, the tortilla is flexible and tough.

With the growing popularity of tamales, enchiladas, and like Spanish-American dishes among the people of this and other nations large factories are being established in which these articles are put up in great quantities, being canned or otherwise preserved in permanent form to be shipped, as desired.

The present invention pertains especially to the manufacture of enchiladas—a composition of meats, peppers, sauces, spices, and other things of distinctly Mexican flavor.

Where enchiladas are manufactured in commercial quantities, it is usual to wrap them in tortillas, enabling them to be put into a steamer and heated or otherwise readily handled. The tortillas for this purpose are either cut or made square, so as to roll up into a symmetrical package about six or seven inches long and about an inch and a half in diameter. With the increasing demand for this class of goods it has become difficult to obtain sufficient help of the right sort to make all the tortillas by hand that are required. The patting out of the cake by hand before toasting is too slow for modern requirements. Besides the hand-made tortilla is generally round or ragged at the edges and has to be trimmed, resulting in a further loss. Various efforts have been made to press these tortillas out by machinery; but great difficulty has been experience by reason of the persistency with which the corn-paste will stick to everything. When a tortilla is pressed out to the proper thickness, ready for toasting or baking, it is not much, if any, over one thirty-second of an inch in thickness. Consequently, if they are to be pressed out mechanically, it requires, first, a die of that depth open at the ends and of the proper configuration; secondly, suitable non-adhesive end closures for the dies, and, thirdly, a suitable press.

The drawings herewith accompanying show suitable mechanism for practicing our invention, which is the pressing out preparatory to baking of tortillas by mechanical means rather than by hand.

Figure 2:
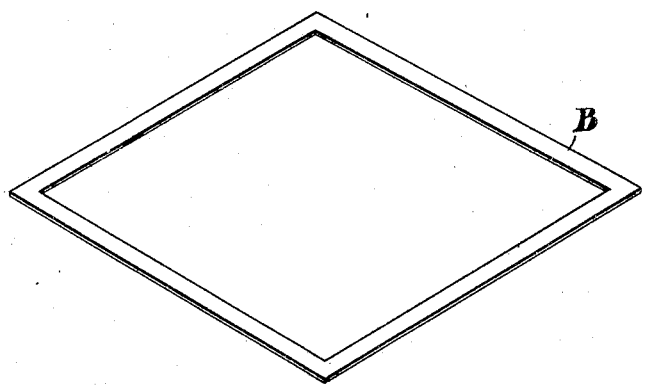

Figure 1 is a sectional view of a portion of a press. Fig. 2 is a perspective of a die.

A represents a press of any suitable description open at the sides and having a base-plate and a follower 2, between which the compressing is to be done.

B is a die, preferably of thin sheet metal, of suitable size and configuration, and C represents cloths adapted to be wet and to serve as end closures for the die.

In practicing our invention the corn is cooked and prepared as before to form a moderately-stiff dough. One of the cloths C is wetted and laid on the base-plate beneath the follower. A piece of dough of the proper size to form a tortilla is then placed on this cloth and inside the die, and then the second cloth, also wetted, is laid over the die and contained dough. Pressure being applied to reciprocate the follower, the dough is squeezed out to fill the die-space, any excess oozing out between the edges of the die and the cloths.

As soon as the die is thus filled the follower may be lifted, and the closely-pressed-together cloths and intermediately-held die and dough are removed and laid on a table, whereupon the cloths are readily stripped from the cake, which latter is also easily detached from the die and is of such texture as not readily to fall or break apart. The cake is then cooked in the usual manner as a tortilla. By this method the cakes may be made very rapidly and in any desired quantity, which are main desiderata. No particularly-skilled labor is necessary, and the tortillas will be of uniform shape and size.

The dough apparently has little or no affinity for the wet cloths, although polished metal plates, wood, and various other closure means were resorted to unavailingly. One reason for this is believed to lie in the reticulated character of the cloth, allowing air to penetrate readily through to the dough-surface to overcome atmospheric pressure. Being wet and remaining so, the cloths do not afford a suitable surface for a paste to adhere to. In fact, the essential point in the manufacture of tortillas by mechanical means is the submission of the original dough mixture to pressure between two non-adhesive surfaces. The dies are for the purpose of giving uniformity of shape, area, and thickness to the finished product.

Having thus described our invention, what we claim, and desire to secure by Letters Patent, is—

1. The manufacture of tortillas which comprehends the submission of a suitable dough to pressure in a press between removable and separable non-adhesive surfaces and the toasting or baking of the pressed product.

2. In the manufacture of tortillas and as a step therein, the submission of the dough mixture to pressure by mechanical means between removable and relatively separable non-adhesive surfaces.

3. In the manufacture of tortillas and as a step therein, the submission of the dough mixture to pressure by mechanical means between removable and separable non-adhesive reticulated surfaces.

4. In the manufacture of tortillas and as a step therein, the submission of the dough mixture to pressure by mechanical means between removable and separable non-adhesive reticulated moist surfaces.

5. In the manufacture of tortillas and as a step therein, the submission of the dough to pressure by mechanical means in an open-ended die and between removable and separable non-adhesive surfaces.

6. In the manufacture of tortillas and as a step therein, the submission of the dough to pressure by mechanical means in an open-ended die and between removable and separable non-adhesive reticulated surfaces.

7. In the manufacture of tortillas and as a step therein, the submission of the dough to pressure by mechanical means in an open-ended die and between removable and separable non-adhesive reticulated wet surfaces.

8. In the manufacture of tortillas and as a step therein, the submission of the dough to pressure by mechanical means in an open-ended removable die and between separable wet cloths.

In testimony whereof we have hereunto set our hands in presence of two subscribing witnesses.

CHARLES H. WORKMAN.
JULIUS EISENBACH.

Witnesses:
A. K. DAGGETT,
D. L. GORMAN.